United States Patent Office 2,911,116
Patented Nov. 3, 1959

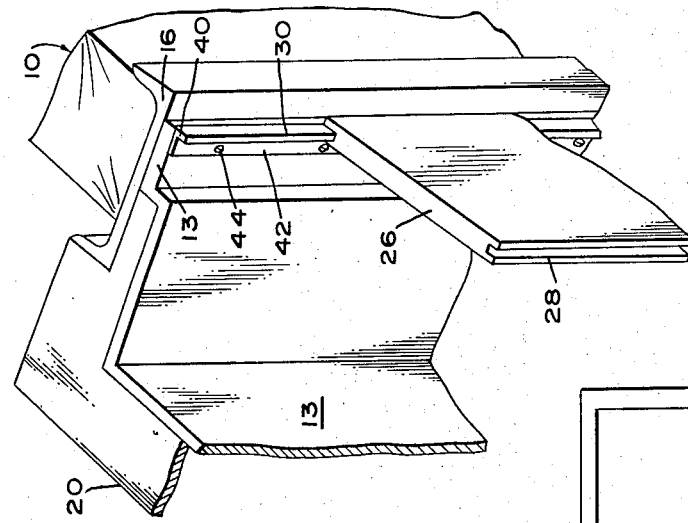
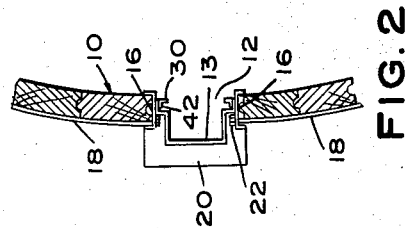
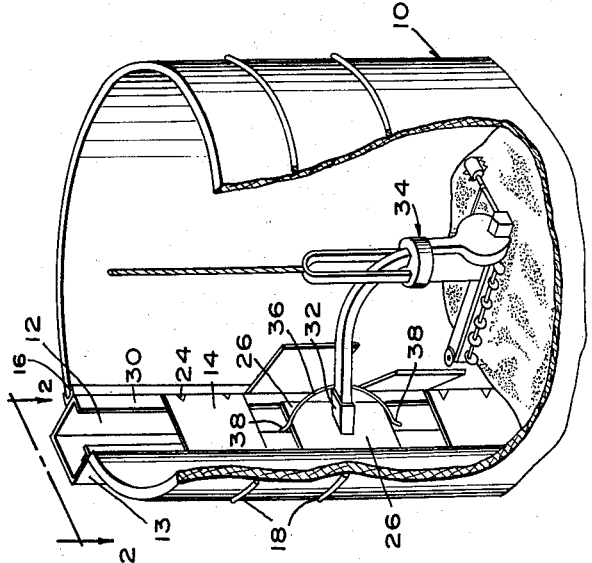
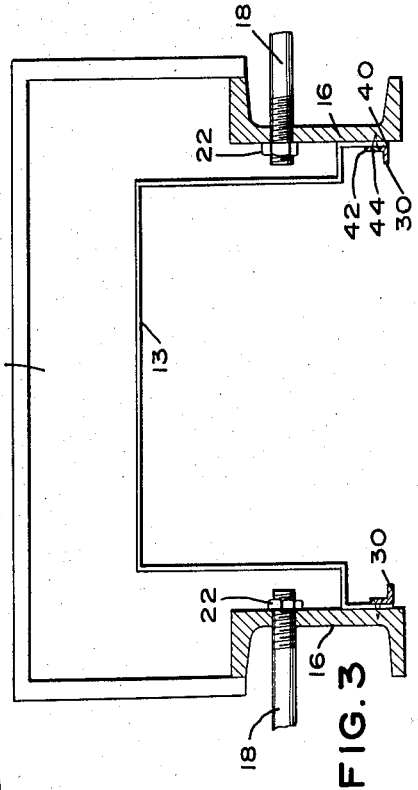

2,911,116

DISCHARGE SYSTEMS FOR SILOS AND SIMILAR STRUCTURES

William R. Anderson, Waupaca, Wis., assignor to Madison Silo Company, a corporation of Wisconsin Application April 23, 1956, Serial No. 579,910

1 Claim. (Cl. 214—17)

The present invention relates to improvements in silos or similar structures and is concerned more particularly with novel unloading or discharge systems therefor.

A principal object of the invention is to provide an automatic silo unloading system whereby to avoid the periodic need, as heretofore, for a person to enter the silo for the purpose of readjusting the doors and the spout of the silo unloading apparatus.

Another object of the invention is to provide an automatic door system for silos or the like wherein successive doors along the length of a continuous vertical silo discharge chute are successively opened for the discharge of material by means carried by surface type unloader apparatus as it descends in the silo.

A further object is in general to improve the construction and unloading or discharge operation of silos and similar structures.

Other objects and advantages will be apparent from the following detailed explanation taken in conjunction with the accompanying drawings wherein a preferred embodiment of the principles of the invention has been selected for exemplification.

In the drawings:

Fig. 1 is a perspective view of the top portion of a silo of the surface unloading type shown equipped with the improvements of the present invention and having a front wall portion thereof broken away and the upper silo door removed;

Fig. 2 is a fragmentary sectional view through the silo discharge chute taken on the line 2—2 of Fig. 1;

Fig. 3 is an enlarged fragmentary sectional view through the silo discharge chute showing the truss frame; and Fig. 4 is an enlarged fragmentary perspective view of the chute and travelling frame looking outwardly of the silo.

Referring more particularly to the drawings, wherein like numerals refer to like parts, the silo indicated in its entirety at 10 may be of any conventional construction. The present invention, however, contemplates that a continuous vertical opening 12 be provided in the sidewall thereof to define a continuous vertical silo chute 13 and that a plurality of doors 14 be arranged substantially in adjacent edge to edge relationship along the length of such opening to be successively opened for discharge of material into the chute. In the preferred construction, the opening 12 is framed on opposed sides with a channel member 16 to which is anchored the usual silo reinforcing rods 18 by bolts 22. Structural frames or trusses 20, preferably steel or iron plates, encircle the outside of silo chute 13 at spaced intervals near the location where reinforcing rods 18 are anchored to channel members 16, whereby to carry the tension of the rods 18 out and around chute 13 which remains unobstructed, and to give support to chute 13. Trusses 20 are welded or otherwise suitably attached to the vertical frames or channel members 16.

The doors 14 are secured to the interior side of the frame or channel member 16 by spring loaded hinges 24 which tend normally to hold the doors 14 in closed position. The interior faces of the doors 14 and the frame member 16 are preferably flush with the interior wall of the silo 10.

A travelling frame 26 is adapted to move upwardly and downwardly of the length of the vertical opening 12 which forms the entrance to the chute 13 and to this end the opposed grooved vertical edges 28 thereof are slidably supported on opposed guide tracks 30 projecting inwardly from opposed sides of the frame member 16. As shown, guide track 30 may constitute one side of angle iron 40. The other side 42 of the angle iron 40 is secured to silo chute 13 and vertical frame or channel member 16 by screws 44 or other suitable means, thereby also attaching silo chute 13 to channel member 16. The travelling frame 26 is attached to the spout 32 forming a part of the surface unloading mechanism indicated in its entirety at 34 so that the frame 26 moves upwardly and downwardly as a part of the unloading mechanism as it is elevated or descended in the silo. A cam 36 having inclined end portions 38 is carried by the travelling frame 26 and as the frame descends in the silo the lower inclined end portion bears against the upper horizontal edge of a succeeding door 14 so that a door 14 is always in open position affording access to the chute 13 at the level of the frame 26 and the discharge spout 32. As each opened door 14 is passed the spring loaded hinges urge the same to closed position. The door opening and closing action is reversed when the unloading mechanism 34 is elevated to the top of the silo after complete discharge of the material.

From the foregoing it will be apparent that the series of doors 14, the number and size of which may vary as desired in accordance with the size of the silo, are automatically successively opened at the correct level of ingress to the chute 13 to provide for the continuous discharge of material from the silo without interruption for the manual opening and closing of the doors.

It is to be understood that the present invention is not confined to the particular construction and arrangement of parts herein illustrated and described but embraces all such modified forms thereof as may come within the scope of the following claim.

I claim:

In a silo including a surface type unloader for discharging material into a vertical chute, a plurality of doors disposed substantially in adjacent edge to edge relationship along the length of said chute, a travelling frame carried by said unloader, track means adjacent the entrance to said chute to guide said travelling frame along the length of said chute and an inwardly extending cam carried by said travelling frame, the said cam having inclined opposed end portions to bear against adjacent door edges as said frame travels along the length of said chute whereby successively to open and to guide the closure of said doors.

References Cited in the file of this patent

UNITED STATES PATENTS

| | | |
|---|---|---|
| 1,740,250 | Kutz et al. | Dec. 17, 1929 |
| 2,003,083 | Keller | May 28, 1935 |
| 2,322,923 | Craine | June 29, 1943 |
| 2,595,333 | Clapp | May 6, 1952 |
| 2,735,591 | Branchflower | Feb. 21, 1956 |